United States Patent
Yang et al.

(10) Patent No.: US 11,286,328 B2
(45) Date of Patent: Mar. 29, 2022

(54) THERMOPLASTIC POLYURETHANE ELASTOMER, AND PREPARATION METHOD, USE AND PRODUCT THEREOF

(71) Applicant: Wanhua Chemical Group Co., Ltd., Yantai (CN)

(72) Inventors: Jie Yang, Yantai (CN); Qishan Huang, Yantai (CN)

(73) Assignee: Wanhua Chemical Group Co., Ltd.

(*) Notice: Subject to any disclaimer, the term of this patent is extended or adjusted under 35 U.S.C. 154(b) by 344 days.

(21) Appl. No.: 15/767,528

(22) PCT Filed: Nov. 17, 2015

(86) PCT No.: PCT/CN2015/094798
§ 371 (c)(1),
(2) Date: Apr. 11, 2018

(87) PCT Pub. No.: WO2017/079988
PCT Pub. Date: May 18, 2017

(65) Prior Publication Data
US 2018/0291141 A1    Oct. 11, 2018

(30) Foreign Application Priority Data

Nov. 11, 2015  (CN) .......................... 201510762148.3

(51) Int. Cl.
| | | |
|---|---|---|
| *C08G 18/42* | (2006.01) | |
| *C08G 18/22* | (2006.01) | |
| *C08G 18/75* | (2006.01) | |
| *C08G 18/76* | (2006.01) | |
| *C08G 18/12* | (2006.01) | |
| *C08G 18/66* | (2006.01) | |
| *C08G 18/10* | (2006.01) | |
| *C08G 63/183* | (2006.01) | |
| *C08L 75/04* | (2006.01) | |
| *B33Y 70/00* | (2020.01) | |

(52) U.S. Cl.
CPC ......... *C08G 18/4202* (2013.01); *C08G 18/10* (2013.01); *C08G 18/12* (2013.01); *C08G 18/222* (2013.01); *C08G 18/227* (2013.01); *C08G 18/4211* (2013.01); *C08G 18/4213* (2013.01); *C08G 18/4216* (2013.01); *C08G 18/4238* (2013.01); *C08G 18/664* (2013.01); *C08G 18/758* (2013.01); *C08G 18/7671* (2013.01); *C08G 63/183* (2013.01); *C08L 75/04* (2013.01); *B33Y 70/00* (2014.12); *C08L 2207/04* (2013.01)

(58) Field of Classification Search
CPC ............................ C08G 63/183; C08G 18/222; C08G 18/4216; C08G 18/227; C08G 18/758; C08G 18/4238; C08G 18/7671; C08G 18/4202; C08G 18/10; C08G 18/12; C08G 18/4211; C08G 18/4213; C08G 18/664; C08L 75/04; C08L 2207/04; B33Y 70/00
See application file for complete search history.

(56) References Cited

U.S. PATENT DOCUMENTS

| | | | | |
|---|---|---|---|---|
| 5,780,573 A | * | 7/1998 | Iwata ................. | C08G 18/0895 528/272 |
| 2006/0199925 A1 | | 9/2006 | Matsuura et al. | |
| 2007/0208104 A1 | * | 9/2007 | Pudleiner ................ | A61L 29/16 523/122 |

FOREIGN PATENT DOCUMENTS

| | | |
|---|---|---|
| CN | 100354322 C | 12/2007 |
| CN | 101735426 A | 6/2010 |
| CN | 101735596 A | 6/2010 |
| CN | 103059554 A | 4/2013 |
| CN | 103665828 A | 3/2014 |
| CN | 103756236 A | 4/2014 |
| CN | 103980449 A | 8/2014 |
| CN | 104004377 A | 8/2014 |
| CN | 104961881 A | 10/2015 |
| JP | S6253321 A | 3/1987 |
| JP | S6348321 A | 3/1988 |
| JP | 2011506688 A | 3/2011 |
| JP | 2011516692 A | 5/2011 |
| JP | 201581305 A | 4/2015 |
| WO | 2005089778 A1 | 9/2005 |
| WO | 2015075186 A1 | 5/2015 |

OTHER PUBLICATIONS

International Search Report for PCT/CN2015/094798 dated Aug. 5, 2016.

* cited by examiner

*Primary Examiner* — Rabon A Sergent
(74) *Attorney, Agent, or Firm* — Lerner, David, Littenberg, Krumholz & Mentlik, LLP

(57) ABSTRACT

The present invention discloses a thermoplastic polyurethane elastomer (TPU), and a preparation method, use and product thereof. The thermoplastic polyurethane elastomer comprises the following components with respect to the total weight of TPU: 22-55 wt % of an aromatic diisocyanate and/or alicyclic diisocyanate; 2-16 wt % of a chain extender; and 30-70 wt % of a polyester polyol. The invention can reduce a TPU injection molding shrinkage to 0.2% or less, and can increase the thermal decomposition temperature to up to 300° C., and can obtain elastomeric materials of different hardnesses, thus having a broad prospect of application in 3D printing methods.

13 Claims, No Drawings

THERMOPLASTIC POLYURETHANE ELASTOMER, AND PREPARATION METHOD, USE AND PRODUCT THEREOF

CROSS REFERENCE TO RELATED APPLICATIONS

The present application is a national phase entry under 35 U.S.C. § 371 of International Application No. PCT/CN2015/094798, filed Nov. 17, 2015, which claims priority from Chinese Patent Application No. 201510762148.3 filed Nov. 11, 2015, all of which are hereby incorporated herein by reference.

TECHNICAL FIELD

The present invention relates to polyurethane. Specifically, the present invention relates to a thermoplastic polyurethane elastomer with a low shrinkage and a good heat resistance, a preparation process, use and product thereof, which are applicable to 3D printing.

BACKGROUND OF ART 3D printing is a technique of manufacturing three-dimensional products by adding materials layer by layer via 3D printing equipment based on designed 3D models. Currently used 3D printing includes selective laser sintering (SLS), stereolithography (SLA) and fused deposition modeling (FDM) and so on. Among them, FDM is of the highest popularity. The operating principle of FDM is that, a thermoplastic polymer material is extruded in the molten state from a nozzle and solidified to form a thin layer of a contour shape, and then the material is added layer by layer to form the product finally. At present, only a few polymer materials can be used in FDM, and relatively common used thermoplastic materials include acrylonitrile-butadiene-styrene copolymer (ABS), polylactic acid (PLA), polyamide (PA), and polycarbonate (PC). The products molded from these materials have strong rigidity and are difficult to be used in flexible application areas such as chains, cords and joints, thus the scope of application is limited by the materials.

Thermoplastic polyurethane elastomer (TPU) has a great application value due to its good elastomer properties and thermoplastic processability. However, it did not get enough attention in the field of 3D printing materials. TPU is formed by linear polyols, organic diisocyanates, and short chain diols/diamines (also referred to as chain growth agents or chain extenders). In addition, an organometallic catalyst, such as an organotin compound or an organobismuth compound, may be added to accelerate the formation reaction. In order to adjust the properties, the molar ratios of the above components can be varied within a wide range, while the hardness of TPU is mainly established by the ratio of hard segment (chain growth agent/chain extender+isocyanate) to soft segment (polyol). Prior research has proved that a more suitable molar ratio of polyol to chain growth agent/chain extender is 1:1~1:12, by which a hardness of the resulted product in the range of Shore 80A~Shore 70D can be obtained. In another aspect, the selection of aromatic rings, alicyclic rings and the like with a rigid molecular structure can further optimize the mechanical and thermal resistance of the TPU. Thermoplastic polyurethane elastomers can be prepared either in steps (prepolymer metering processes) or by reacting all of the components simultaneously in one stage (one-step metering process).

TPU and other thermoplastic elastomers generally have a large shrinkage in thermoplastic processing. CN100354332C discloses a process for preparing a soft thermoplastic polyurethane elastomer which has a low shrinkage and is easy to demould. However, the thermoplastic polyurethane elastomer is suitable for molding processes which are quite different from 3D printing processes. If a material has a large shrinkage and an unstable size, it will make the stereoscopic model tend to deform and damage, especially the model base is easy to tilt during the printing, and will resulting in printing failure.

In addition, the prior art discloses using elastomeric compositions as elastomeric 3D printing consumables. CN104004377A discloses a soft elastic 3D printing rubber consumable, which is made by blending thermoplastic elastomer (such as ethylene-vinyl acetate copolymer, thermoplastic vulcanized elastomer, etc.) and TPU soft material with rigid PLA. CN103756236A discloses a thermoplastic elastomer composition for preparing a soft rapidly-forming, three-dimensionally-printing material, which comprises a blend of TPU elastomer and a rigid polyolefin material such as polypropylene, polyethylene and the like, wherein the blending of the soft and hard polymers reduces the shrinkage of the blend. Nevertheless, the preparation method is complicated; and as the blended components are tend to separate from each other, the compatibilizer must be added to improve the compatibility. Therefore, it is difficult to maintain the elastomeric properties in a controlled manner. The prior art does not involve modifying the molecular structure of the TPU so as to make 3D printing consumables.

SUMMARY OF THE INVENTION

In view of the problems in the prior art, the object of the present invention is to provide a heat-resistant thermoplastic polyurethane elastomer material with a high applicability and a low shrinkage, and a preparation method, use and product thereof.

To achieve the above object, in one aspect, the present invention adopts the following technical solutions.

A thermoplastic polyurethane elastomer comprising the following components, with respect to the total weight of the thermoplastic polyurethane elastomer:

(a) 22 to 55 wt %, preferably 25 to 50 wt % of a diisocyanate;

(b) 2 to 16 wt %, preferably 3 to 15 wt % of a chain extender;

(c) 30 to 70 wt %, preferably 35 to 60 wt % of a polyester polyol;

wherein the diisocyanate is an aromatic diisocyanate and/or an alicyclic diisocyanate; the number average molecular weight of the polyester polyol is 600 to 5000 g/mol, preferably 800 to 4000 g/mol; the molecular weight of the chain extender is 60 to 600 g/mol.

The diisocyanate of the present invention is an aromatic diisocyanate and/or an alicyclic diisocyanate. Researches show that the ring structures in the diisocyanates are important to achieve the object of the present invention. The aromatic diisocyanate is preferably one or two or more selected from toluene diisocyanate, diphenylmethane diisocyanate, naphthalene diisocyanate, 1,4-phenylene diisocyanate, xylylene diisocyanate, tetramethylene m-xylylene diisocyanate, dimethylbiphenyl diisocyanate, dimethyl diphenylmethane diisocyanate, 3,3'-dimethoxybiphenyl-4, 4'-diisocyanate, 4,4'-diphenyl ether diisocyanate, 4-methyldiphenylmethane-3,4-diisocyanate, 2,4'-diphenyl sulfide diisocyanate, diethylbenzene diisocyanate and 4,4'-diphenylethane diisocyanate.

The alicyclic diisocyanate according to the present invention is preferably one or two or more selected from 4,4'-dicyclohexylmethane diisocyanate, isophorone diisocyanate, 1,4-diisocyanatocyclohexane, cyclohexane dimethylene diisocyanate, norbornane diisocyanate and methylcyclohexyl diisocyanate. In the present invention, the polyester polyol is preferably an aliphatic polyester polyol or an aromatic polyester polyol. The structural formula of the aliphatic polyester polyol is preferably:

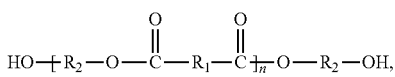

wherein each of $R_1$ and $R_2$ independently represents a linear alkylidene having 2 to 10 carbon atoms or a branched alkylidene having 3 to 10 carbon atoms. It is worth pointing out that when the two $R_2$ represent a linear alkylidene (or a branched alkylidene), they may be either the same linear alkylidene (or branched alkylidene) or different linear alkylidenes (or branched alkylidenes); preferably, the number of carbon atoms in side chains of the branched alkylidene in the aliphatic polyester polyol is 3 to 5, and the number of carbon atoms in the linear alkylidene is 2 to 6; more preferably, the molar ratio of the branched alkylidene to the linear alkylidene in the aliphatic polyester polyol is from 1:1 to 7:1, preferably from 3:1 to 7:1.

Examples of a suitable aliphatic polyester polyol include, but are not limited to, poly (ethylene glycol adipate) diol, poly (butylene glycol adipate) diol, poly (2-ethyl-3-propyl-succinic acid ethylene glycol ester) diol, poly ([2-ethyl-3-propyl-succinic acid] [2-ethyl-1,3-hexanediol] [ethylene glycol] ester) diol, poly (3-methyl-1,5-pentanediol sebacate) diol, poly (diethyl pentanediol succinate) diol, and the like.

The aromatic polyester polyol is preferably one or two or more selected from the following structural formulas:

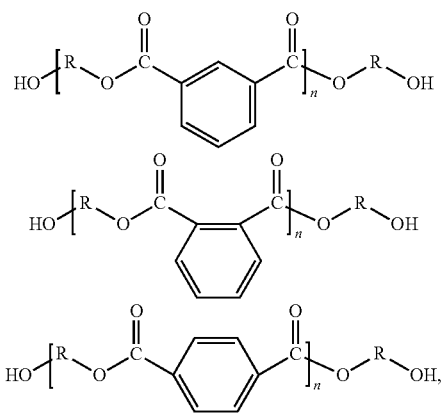

wherein R is a linear alkylidene having 2 to 12 carbon atoms or a branched alkylidene having 3 to 12 carbon atoms; preferably, in the aromatic polyester polyol, the number of the carbon atoms in the branched alkylidene is 3 to 6, the number of carbon atoms in the linear alkylidene is 2 to 8.

Examples of a suitable aromatic polyester polyol include, but are not limited to, poly (diethylene glycolphthalate) diol, poly (neopentyl glycol phthalate) diol, poly (2-ethyl-1,3-hexanediol terephthalate) diol, poly (neopentyl glycol terephthalate) diol, poly (neopentyl glycol isophthalate) diol, poly (diethyl pentanediol isophthalate) diol, and the like.

In the present invention, the linear alkylidene indicates a —$(CH_2)_n$— structure; and the branched alkylidene indicates an alkylidene having a side chain.

The polyester polyol of the present invention can be prepared by methods known to those skilled in the art.

In a preferred embodiment of the present invention, the polyester polyol is a composition of an aliphatic polyester polyol and an aromatic polyester polyol with a weight ratio from 0.11:1 to 8.5:1, preferably from 0.2:1 to 4:1. By using a composition of an aliphatic polyester polyol and an aromatic polyester polyol, it's possible not only to make comprehensive utilization of the advantages of the aliphatic polyester polyol comprising a good flexibility and an ability of promoting crystallization of the rigid phase, and the advantages of the aromatic polyester polyol comprising a good rigidity, a good heat resistance and an ability of inhibiting the shrinkage of the TPU, but also to simplify the formulation design and further improve the desired performance.

The chain extender of the present invention may be a small molecular chain extender commonly used in the art, for example, it may be one or two or more chain extender selected from of aliphatic diols, aliphatic alcoholamines, alicyclic diamines, aromatic diols, aromatic alcoholamines, and aromatic diamines.

Wherein the aliphatic diol is an aliphatic diol having 3 to 8 carbon atoms, the aliphatic alcoholamine is an aliphatic alcoholamine having 3 to 8 carbon atoms; preferably, it may be one or two or more selected from 1,3-propanediol, 1,4-butanediol, 2,3-butanediol, 1,5-pentanediol, 1,6-hexanediol, 1,8-octanediol, diethanolamine and methyldiethanolamine.

The aliphatic diamine is preferably one or two or more selected from 5-amino-1,3,3-trimethylcyclohexanemethylamine, 4,4'-diaminodicyclohexyl methane, 1,4-cyclohexanediamine, trimethylhexamethylenediamine, 3,3'-dimethyl-4,4'-diaminodicyclohexylmethane, cyclohexanediamine and cyclohexanedimethanamine.

The aromatic diol or aromatic alcoholamine is preferably one or two or more selected from hydroquinone dihydroxyalkylether, resorcinol dihydroxyethylether, resorcinol bishydroxypropyl (alkyl) ether, bisphenol A dihydroxyalkyl ether, bishydroxyisopropylaniline, dihydroxyisopropyl p-toluidine, dihydroxyethyl p-toluidine, dihydroxyethyl m-toluidine and bishydroxyethylaniline.

The aromatic diamine is preferably one or more selected from 4'4-diaminodiphenylmethane, propylene glycol bis(4-aminobenzoate), 4,4'-methylenebis(3-chloro-2,6-diethylaniline) and 3,5-dimethyltoluenediamine.

The molar ratio of isocyanato to active hydrogen in the thermoplastic polyurethane elastomer of the present invention is 0.8:1 to 1.3:1, preferably 0.9:1 to 1.1:1.

Catalysts may also be used for the preparation of the thermoplastic polyurethane elastomer according to the invention. Suitable catalysts include tertiary amines and/or organometallic compounds. Examples of suitable tertiary amines are triethylamine, dimethylcyclohexylamine, N-methylmorpholine, N,N'-dimethylpiperazine, 2-(dimethylaminoethoxy)-ethanol, diazabicyclo [2,2,2]-octane and the like. Suitable examples of organometallic compounds are titanates, iron compounds, bismuth compounds, tin compounds and the like, and specific examples are bismuth isooctanoate, tin diacetate, tin dioctoate, tin dilaurate, or dialkyltin salts of aliphatic carboxylic acids such as dibutyltin diacetate or dibutyltin dilaurate and the like.

The catalysts according to the invention are preferably organometallic compounds, in particular one or two or more selected from titanates and the organometallic compounds of iron and tin.

The catalyst according to the invention is used in an amount of 0.001 to 0.01 wt %, preferably from 0.002 to 0.006 wt %, based on the total weight of the thermoplastic polyurethane elastomer.

The present invention also provides a process for preparing the thermoplastic polyurethane elastomer defined above, wherein the diisocyanate, the polyester polyol, the chain extender and the optional catalyst according to the proportions defined above are employed to prepare the thermoplastic polyurethane elastomer.

The preparation of the thermoplastic polyurethane elastomer according to the present invention may be carried out by a prepolymer metering process comprising the steps of: according to the proportions defined above, heating and melting the diisocyanate, and then adding the polyester polyol and optionally the catalyst to form a stable prepolymer at 70 to 100° C., then mixing the chain extender and the prepolymer evenly, and curing for 20 to 24 h at 80 to 120□, to obtain a thermoplastic polyurethane elastomer.

Alternatively, the thermoplastic polyurethane elastomers described herein can also be prepared by a one-step metering process comprising the steps of: according to the proportions defined above, adding the diisocyanate, the polyester polyol, the chain extender, and optionally the catalyst to a mixing apparatus, typically a twin-screw extruder, and conducting the polymerization reaction to obtain a thermoplastic polyurethane elastomer.

As used herein, "optional" or "optionally" means "containing" or "not containing."

The present invention also provides the use of the above thermoplastic polyurethane elastomer in 3D printing wherein the thermoplastic polyurethane elastomer of the present invention is used as the 3D printing material, that is, the above-mentioned thermoplastic polyurethane elastomer is used as the only 3D printing material or as one of the 3D printing materials, when printing.

The thermoplastic polyurethane elastomer of the present invention, when being used for 3D printing, may include the steps of: subjecting the TPU to extrusion and/or pulverization followed by melt deposition molding (FDM) or selective laser sintering (SLS).

Specifically, the process for FDM comprises the following steps: adding pellets of the thermoplastic polyurethane elastomer of the present invention into a screw extruder; extruding a TPU line by a screw; sufficiently cooling the TPU line to form a wire material; rolling up the wire material in a towing machine, wherein the size and diameter of the wire was fixed by a pulling force and the wire material was wound into a reel automatically, obtaining a finished product. The equipment used for FDM processing is, for example, a 3D printer Replicator II of MakerBot.

The process for SLS comprises the following steps: adding pellets of the thermoplastic polyurethane elastomer of the present invention into a cryogenic sample crusher; cooling the pellets to a low temperature by using liquid nitrogen as a cold source, to form a brittle state which is easy to be pulverized; pulverizing the pellets into fine particles; grading and collecting the fine particles via an air flow sieve grading machine, the particle size of which ranges from 10 um to 200 um. The equipment used for SLS processing is, for example, a 3D printer ProX™ 500 of 3D system.

The present invention also provides a 3D printed article, wherein the printing material of the 3D printed article is the thermoplastic polyurethane elastomer of the present invention.

Compared with the prior art, the present invention has the following beneficial effects:

(1) The present invention focuses on the raw materials as reactants, and can obtain a heat-resistant thermoplastic polyurethane elastomer having a low shrinkage by synthesis and modification, which is suitable for industrial production and can ensure the stability of the properties of the material, wherein the injection shrinkage of the material can be reduced to 0.2% or less, and the thermal decomposition temperature can be increased to 300° C. or more.

(2) By adjusting the components of the reactants and the proportion of each component, a printing material with the hardness of 60A to 70D can be obtained.

(3) The thermoplastic polyurethane elastomer of the present application is suitable for various methods of rapid prototyping by melting thermoplastic materials, and various flexible parts can be printed, thereby greatly improving the applicable scope of 3D printing. On a FDM processing equipment, at a printing speed of no less than 40 mm/s, the obtained printed product shows no significant deformation, and the base of the printed product has no tilt.

EMBODIMENTS

The method provided by the present invention is further described in details below. However, the present invention is not limited thereto by any means.

The chemical reagents used in the following examples were of analytical grade;

Characterization methods of the relevant parameters are shown in Table 1:

TABLE 1

| Test | Test instruments and test conditions | Test standards |
|---|---|---|
| Number average molecular weight | WATERS GPC 2000, DMF was used as the mobile phase | Refer to instrument manual |
| Hardness | Shore A hardness meter | ASTM D2240-05 |
| Initial decomposition temperature | A thermogravimetric analyzer of NETZSCH Group, Germany(NETZSCHTGA) Test Conditions: Heating rate: 10□/min Termination temperature: 700° C. | Refer to instrument manual |
| Tensile Strength | Universal material testing machine from Insrron, US Test conditions for tensile strength and nominal strain at break: | GB/T 1040.2-2006 |

TABLE 1-continued

Test method

| Test | Test instruments and test conditions | Test standards |
| --- | --- | --- |
| Elongation at break | Stretching rate 50 mm/min, tensile spline according to the national standard<br>Bending strength test conditions: | GB/T 9341 -2008 |
| Shrinkage | Haitian SA900II/260 plastic injection molding machine, in the molding machine, the first zone temperature 180° C., the second zone temperature 185° C., the third zone temperature 190° C., the fourth zone temperature 195° C., the fifth zone temperature 190° C., injection pressure 50 bar, back pressure 3 bar | ASTM D 955-08 standard |

The present invention is further described in details by the following specific embodiments. However, it should not be understood that the scope of the present invention is limited to the following examples. It should be understood that without departing from the idea of the above method of the present invention, various alternations and modifications made according to the ordinary technical knowledge and the common method in the art should be included in the scope of the present invention.

The polyester polyols used in the examples were prepared as follows:

Polyester 1: poly (ethylene glycol adipate) diol, with a number average molecular weight of 600 g/mol Adipic acid and ethylene glycol, together with tetraisopropyl titanate as a catalyst, were put into a polycondensation autoclave. The molar ratio of alcohol to acid in the raw material was 1.15. From the top of the autoclave was introduced nitrogen 0.1 MPa. The temperature of the reaction mixture in the autoclave was gradually increased to 130 to 140° C., and kept for 0.5 to 1.5 h. The temperature of the reaction product was then gradually increased to 220 to 230° C. for dehydrating the reaction product to a moisture content of 0.3% to 0.5%. The reaction product continued to be dehydrated and dealcoholized by vacuum distillation at 220 to 230° C. so as to control the hydroxyl value of the product to 189 mg KOH/g and obtain a product with a number average molecular weight of 600 g/mol. The product was cooled and withdrawn at room temperature.

Polyester 1-2: poly (ethylene glycol adipate) diol, with a number average molecular weight of 2000 g/mol The synthesis method was the same as that of polyester 1, except that the hydroxyl value of the product was controlled to 56 mg KOH/g to obtain a product having a number average molecular weight of 2000 g/mol.

Polyester 1-3: poly (ethylene glycol adipate) diol, with a number average molecular weight of 1000 g/mol The synthesis method was the same as that of polyester 1, except that the hydroxyl value of the product was controlled to 108 mg KOH/g to obtain a product having a number average molecular weight of 1000 g/mol.

Polyester 1-4: poly (ethylene glycol adipate) diol, with a number average molecular weight of 3000 g/mol The synthesis method was the same as that of polyester 1, except that the hydroxyl value of the product was controlled to 38 mg KOH/g to obtain a product having a number average molecular weight of 3000 g/mol.

Polyester 2: poly (neopentyl glycol phthalate) diol, with a number average molecular weight of 600 g/mol Phthalic acid and neopentyl glycol, together with tetraisopropyl titanate as a catalyst, were put into a polycondensation autoclave, while the other conditions were the same as those of the synthesis method of the polyester 1. The hydroxyl value of product was controlled to 189 mg KOH/g, to obtain a product having a number average molecular weight of 600 g/mol.

Polyester 2-2: poly (neopentyl glycol phthalate) diol, with a number average molecular weight of 5000 g/mol The synthesis method was the same as that of polyester 2, except that the hydroxyl value of the product was controlled to 22.4 mg KOH/g to obtain a product having a number average molecular weight of 5000 g/mol.

Polyester 2-3: poly (neopentyl glycol phthalate) diol, with a number average molecular weight of 3000 g/mol The synthesis method was the same as that of polyester 2, except that the hydroxyl value of the product was controlled to 38 mg KOH/g to obtain a product having a number average molecular weight of 3000 g/mol.

Polyester 2-4: poly (neopentyl glycol phthalate) diol, with a number average molecular weight of 1000 g/mol The synthesis method was the same as that of polyester 2, except that the hydroxyl value of the product was controlled to 108 mg KOH/g to obtain a product having a number average molecular weight of 1000 g/mol.

Polyester 3: poly (ethylene glycol 2-ethyl-3-propyl-succinate) diol(the molar ratio of branched alkylidene to linear alkylidene is 1:1), with a number average molecular weight of 2500 g/mol 2-ethyl-3-propyl-succinic acid and ethylene glycol, together with tetraisopropyl titanate as a catalyst, were put into a polycondensation autoclave, while the other conditions were the same as the synthesis method of polyester 1. A product having a number average molecular weight of 2500 g/mol was obtained by controlling the hydroxyl value of the product to 45 mg KOH/g.

Polyester 4: poly ([2-ethyl-3-propyl-succinic acid] [2-ethyl-1,3-hexanediol] [ethylene glycol] ester) diol(the molar ratio of branched alkylidene to linear alkylidene is 3:1), with a number average molecular weight of 2500 g/mol 2-ethyl-3-propyl-succinic acid, 2-ethyl-1,3-hexanediol and ethylene glycol, together with tetraisopropyl titanate as a catalyst, were put into a polycondensation autoclave. The molar ratio of alcohol to acid in the raw material was 1.15, and the molar ratio of 2-ethyl-1,3-hexanediol and 2-ethyl-3-propyl-succinic acid with branched units to ethylene glycol with linear units was 3:1. From the top of the autoclave was introduced nitrogen 0.1 MPa. The temperature of the reaction mixture in the autoclave was gradually increased to 130 to 140° C., and kept for 0.5 to 1.5 h. The temperature of the reaction product was then gradually increased to 220 to 230° C., for dehydrating the product to a moisture content of 0.3% to 0.5%. The product continued to be dehydrated and dealcoholized by vacuum distillation at 220 to 230° C. so as to control the hydroxyl value of the product to 45 mg KOH/g and obtain a product having a number average molecular weight of 2500 g/mol. The product was cooled and with drawn at room temperature.

Polyester 4-2: poly ([2-ethyl-3-propyl-succinic acid] [2-ethyl-1,3-hexanediol] [ethylene glycol] ester) diol(the molar ratio of branched alkylidene to linear alkylidene is 3:1), having a number average molecular weight of 600 g/mol The synthesis method was the same as that of polyester 4, except that the hydroxyl value of the product is controlled to 189 mg KOH/g to obtain a product with a number average molecular weight of 600 g/mol.

Polyester 5: poly ([2-ethyl-3-propyl-succinic acid] [2-ethyl-1,3-hexanediol] [ethylene glycol] ester) diol (the molar ratio of branched alkylidene to linear alkylidene is 7:1), with a number average molecular weight of 1000 g/mol The molar ratio of 2-ethyl-1,3-hexanediol and 2-ethyl-3-propyl-succinic acid that provide branched alkylidene structural units to ethylene glycol that provides linear alkylidene structural units was 7:1, while the other conditions were the same as the synthesis method of polyester 4. The hydroxyl value of the product is controlled to 108 mg KOH/g to obtain a product having a number average molecular weight of 1000 g/mol.

Polyester 6: poly (2-ethyl-1,3-hexanediol terephthalate) diol, with a number average molecular weight 5000 g/mol Terephthalic acid and 2-ethyl-1,3-hexanediol, together with tetraisopropyl titanate as a catalyst, were put into a polycondensation autoclave, while the other conditions were the same as the synthesis method of polyester 1. The hydroxyl value of the product was controlled to 22.4 mg KOH/g to obtain a product having a number average molecular weight of 5000 g/mol.

Polyester 6-2: poly (2-ethyl-1,3-hexanediol terephthalate) diol, with a number average molecular weight of 1000 g/mol;

The synthesis method was the same as that of polyester 6, except that the hydroxyl value of the product was controlled to 108 mg KOH/g to obtain a product having a number average molecular weight of 1000 g/mol.

Polyester 6-3: poly (2-ethyl-1,3-hexanediol terephthalate) diol, with a number average molecular weight of 600 g/mol;

The synthesis method was the same as that of polyester 6, except that a product having a number average molecular weight of 600 g/mol was obtained by controlling the hydroxyl value of the product to 189 mg KOH/g.

Polyester 7: poly (neopentyl glycol isophthalate)diol, with a number average molecular weight of 2000 g/mol.

Isophthalic acid and neopentyl glycol, together with tetraisopropyl titanate as a catalyst, were put into a polycondensation autoclave, while the other conditions were the same as the synthesis method of polyester 1. The hydroxyl value of the product was controlled to 56 mg KOH/g to obtain a product having a number average molecular weight of 2000 g/mol.

Polyester 7-2: poly (neopentyl glycol isophthalate) diol, with a number average molecular weight of 2500 g/mol The synthesis method was the same as that of polyester 7, except that the hydroxyl value of the product was controlled to 45 mg KOH/g to obtain a product having a number average molecular weight of 2500 g/mol.

Polyester 7-3: poly (neopentyl glycol isophthalate) diol, with a number average molecular weight of 1000 g/mol The synthesis method was the same as that of polyester 7, except that the hydroxyl value of the product was controlled to 108 mg KOH/g to obtain a product having a number average molecular weight of 1000 g/mol.

Example 1 a) 304.0 g polyester 1 and 35.9 g polyester 2 were dehydrated for 2 h at a temperature of 100 to 105° C. and a relative vacuum of −0.098 to −0.01 MPa;

b) 547.4 g 4,4'-dicyclohexylmethane diisocyanate was added into a reactor, and heated to 60° C. Then 0.08 g stannous octoate and the product of step a) were added. The reaction was carried out at a temperature of 70 to 80° C., obtaining a storage-stable prepolymer with an NCO content of 14.4 wt %;

c) 112.6 g 1,3-propanediol was added into the prepolymer obtained in step b), and well mixed. After about 1 mM, the mixture was poured into a mold, and then cured for 24 h in an oven at 120° C. The product was cooled and pulverized to obtain 1 # thermoplastic polyurethane elastomer, with the main performances shown in Table 2.

Example 2 a) 527.3 g polyester 1-2 and 122.6 g polyester 7 were dehydrated for 2 h at a temperature of 100 to 105° C. and a relative vacuum of −0.098 to −0.01 MPa;

b) 237.0 g 4,4'-dicyclohexylmethane diisocyanate was added into a reactor, and heated to 80° C. Then 0.03 g stannous octoate and the product of step a) were added. The reaction was carried out at a temperature of 70 to 80° C., obtaining a storage-stable prepolymer with an NCO content of 5.5 wt %;

c) 112.9 g hydroquinone dihydroxyethyl ether was added into the prepolymer obtained in step b), and well mixed. After about 1 min, the mixture was poured into a mold, and then cured for 24 h in an oven at 120° C. The product was cooled and pulverized to obtain 2 # thermoplastic polyurethane elastomer, with the main performances shown in Table 2.

Example 3 a) 480 g polyester 4 and 120 g polyester 7-2 were dehydrated for 2 h at a temperature of 100 to 105° C. and a relative vacuum of −0.098 to −0.01 MPa;

b) 282.0 g diphenylmethane diisocyanate was added into a reactor, and heated to 70° C. Then 0.1 g bismuth isooctanoate and the product of step a) were added. The reaction was carried out at a temperature of 70 to 80° C., obtaining a storage-stable prepolymer with an NCO content of 8.45 wt %;

c) 133.0 g 1,4-cyclohexanediamine was added into the prepolymer obtained in step b), and well mixed. After about 1 min, the mixture was poured into a mold and then cured for 24 h in an oven at 120° C. The product was cooled and pulverized to obtain 3 # thermoplastic polyurethane elastomer, with the main performances shown in Table 2.

Example 4 a) 331.6 g polyester 2-2 and 118.4 g polyester 6 were dehydrated for 2 h at a temperature of 100 to 105° C. and a relative vacuum of −0.098 to −0.01 MPa;

b) 428.9 g diphenylmethane diisocyanate was added into a reactor, and heated to 70° C. Then 0.01 g bismuth isooctanoate and the product of step a) were added. The reaction was carried out at a temperature of 70 to 80° C., obtaining a storage-stable prepolymer with an NCO content of 15.5 wt %;

c) 121.04 g 1,3-propanediol was added into the prepolymer obtained in step b), and well mixed. After about 1 mM, the mixture was poured into a mold, and then cured for 24 h in an oven at 120° C. The product was cooled and pulverized to obtain 4 # thermoplastic polyurethane elastomer, with the main performances shown in Table 2.

Example 5 a) 700 g polyester 6-2 was dehydrated for 2 h at a temperature of 100 to 105° C. and a relative vacuum of −0.098 to −0.01 MPa;

b) 266.3 g 4,4'-dicyclohexylmethane diisocyanate was added into a reactor, and heated to 70° C. Then 0.04 g stannous octoate and the product of step a) were added. The reaction was carried out at a temperature of 70 to 80° C., obtaining a storage-stable prepolymer with an NCO content of 2.7 wt %;

c) 33.7 g 1,4-cyclohexanediamine was added into the prepolymer obtained in step b), and well mixed. After about 1 min, the mixture was poured into a mold, and then cured for 24 h in an oven at 120° C. The product was cooled and pulverized to obtain 5 # thermoplastic polyurethane elastomer, with the main performances shown in Table 2.

Example 6 a) 443.7 g polyester 2-3 and 66.5 g polyester 1-4 were dehydrated for 2 h at a temperature of 100 to 105° C. and a relative vacuum of −0.098 to −0.01 MPa;

b) 300.0 g diphenylmethane diisocyanate was added into a reactor, and heated to 70° C. Then 0.06 g stannous octoate and the product of step a) were added. The reaction was carried out at a temperature of 70 to 80° C., obtaining a storage-stable prepolymer with an NCO content of 10.7 wt %;

c) 151.4 g hydroquinone dihydroxyethyl ether was added into the prepolymer obtained in step b), and well mixed. After about 1 min, the mixture was poured into a mold, and then cured for 24 h in an oven at 120° C. The product was cooled and pulverized to obtain 6 # thermoplastic polyurethane elastomer, with the main performances shown in Table 2.

Example 7 a) 100 g polyester 3 and 500 g polyester 7-2 were dehydrated for 2 h at a temperature of 100 to 105° C. and a relative vacuum of −0.098 to −0.01 MPa;

b) 295.0 g diphenylmethane diisocyanate was added into a reactor, and heated to 70° C. Then 0.09 g bismuth isooctanoate and the product of step a) were added. The reaction was carried out at a temperature of 70 to 80° C., obtaining a storage-stable prepolymer with an NCO content of 8.8 wt %;

c) 133.0 g 1,4-cyclohexanediamine was added into the prepolymer obtained in step b), and well mixed. After about 1 min, the mixture was poured into a mold and then cured for 24 h in an oven at 120° C. The product was cooled and pulverized to obtain 7 # thermoplastic polyurethane elastomer, with the main performances shown in Table 2.

Example 8 a) 204.0 g polyester 6-3 and 136.0 g polyester 4-2 were dehydrated for 2 h at a temperature of 100 to 105° C. and a relative vacuum of −0.098 to −0.01 MPa;

b) 547.4 g 4,4'-dicyclohexylmethane diisocyanate was added into a reactor, and heated to 60° C. Then 0.08 g stannous octoate and the product of step a) were added. The reaction was carried out at a temperature of 70 to 80° C., obtaining a storage-stable prepolymer with an NCO content of 14.4 wt %;

c) 112.6 g 1,3-propanediol was added into the prepolymer obtained in step b), and well mixed. After about 1 mM, the mixture was poured into a mold, and then cured for 24 h in an oven at 120° C. The product was cooled and pulverized to obtain 8 # thermoplastic polyurethane elastomer, with the main performances shown in Table 2.

Example 9 a) 226.7 g polyester 2-4 and 453.3 g polyester 5 were dehydrated for 2 h at a temperature of 100 to 105° C. and a relative vacuum of −0.098 to −0.01 MPa;

b) 261.3 g 4,4'-dicyclohexylmethane diisocyanate was added into a reactor, and heated to 70° C. Then 0.02 g stannous octoate and the product of step a) were added. The reaction was carried out at a temperature of 70 to 80° C., obtaining a storage-stable prepolymer with an NCO content of 2.8 wt %;

c) 58.7 g 4'4-diaminodiphenylmethane was added into the prepolymer obtained in step b), and well mixed. After about 1 mM, the mixture was poured into a mold, and then cured for 24 h in an oven at 120° C. The product was cooled and pulverized to obtain 9 # thermoplastic polyurethane elastomer, with the main performances shown in Table 2.

Example 10 a) 500 g polyester 5 was dehydrated for 2 h at a temperature of 100 to 105° C. and a relative vacuum of −0.098 to −0.01 MPa;

b) 390.4 g 4,4'-dicyclohexylmethane diisocyanate was added into a reactor, and heated to 70° C. Then 0.03 g stannous octoate and the product of step a) were added. The reaction was carried out at a temperature of 70 to 80° C., obtaining a storage-stable prepolymer with an NCO content of 9.3 wt %;

c) 109.5 g 1,4-cyclohexanediamine was added into the prepolymer obtained in step b), and well mixed. After about 1 min, the mixture was poured into a mold and then cured for 24 h in an oven at 120° C. The product was cooled and pulverized to obtain 10 # thermoplastic polyurethane elastomer, with the main performances shown in Table 2.

Example 11 a) 700 g polyester 7-3 was dehydrated for 2 h at a temperature of 100 to 105° C. and a relative vacuum of −0.098 to −0.01 MPa;

b) 268.3 g 4,4'-dicyclohexylmethane diisocyanate was added into a reactor, and heated to 70° C. Then 0.06 g stannous octoate and the product of step a) were added. The reaction was carried out at a temperature of 70 to 80° C., obtaining a storage-stable prepolymer with an NCO content of 2.8 wt %;

c) 31.6 g 1,4-butanediol as a chain extender was added into the prepolymer obtained in step b), and well mixed. After about 1 min, the mixture was poured into a mold, and then cured for 24 h in an oven at 120° C. The product was cooled and pulverized to obtain 11 # thermoplastic polyurethane elastomer, with the main performances shown in Table 2.

Example 12 a) 550 g polyester 1-3 was dehydrated for 2 h at a temperature of 100 to 105° C. and a relative vacuum of −0.098 to −0.01 MPa;

b) 369.2 g diphenylmethane diisocyanate was added into a reactor, and heated to 70° C. Then 0.09 g stannous octoate and the product of step a) were added. The reaction was carried out at a temperature of 70 to 80° C., obtaining a storage-stable prepolymer with an NCO content of 8.45 wt %;

c) 80.8 g 1,4-butanediol as a chain extender was added into the prepolymer obtained in step b), and well mixed. After about 1 mM, the mixture was poured into a mold, and then cured for 24 h in an oven at 120° C. The product was cooled and pulverized to obtain 12 # thermoplastic polyurethane elastomer, with the main performances shown in Table 2.

Comparative Example 1

13 # Polyether TPU product is Wanthane® WHT-8285 (Wanhua Chemical Group Co., Ltd.). The raw materials for synthesis were diphenylmethane diisocyanate and polytetramethylene ether glycol, using 1,4-butanediol as a chain extender. Related parameters are shown in Table 2.

Comparative Example 2

14 # Polyether TPU product is Wanthane® WHT-8254 (Wanhua Chemical Group Co., Ltd.). The raw materials for synthesis were diphenylmethane diisocyanate and polytetramethylene ether glycol, using 1,4-butanediol as a chain extender. Related parameters are shown in Table 2.

TABLE 2

| | Main performances | | | |
|---|---|---|---|---|
| No. | Hardness/ Shore A | Tensile Strength/MPa | Elongation at break/% | Shrinkage/% | Initial decomposition temperature/° C. |
| 1# | 60 | 20.6 | 169 | 0.32 | 283 |
| 2# | 95 | 37.3 | 231 | 0.51 | 293 |
| 3# | 93 | 37.0 | 487 | 0.27 | 301 |
| 4# | 80 | 42.9 | 564 | 0.24 | 310 |
| 5# | 97 | 42.9 | 470 | 0.23 | 307 |
| 6# | 85 | 45.7 | 751 | 0.28 | 314 |
| 7# | 93 | 39.3 | 460 | 0.22 | 310 |
| 8# | 55 | 22.3 | 210 | 0.20 | 307 |
| 9# | 95 | 35.0 | 443 | 0.17 | 304 |
| 10# | 90 | 37.3 | 381 | 0.34 | 304 |
| 11# | 98 | 45.7 | 347 | 0.45 | 289 |
| 12# | 90 | 32.9 | 441 | 0.56 | 291 |
| 13# | 85 | 23 | 500 | 0.68 | 301 |
| 14# | 96 | 29 | 350 | 0.63 | 305 |

Example 13

Pellets of the above #5 thermoplastic polyurethane elastomer were added to a screw extruder. A TPU line was extruded by a screw, and sufficiently cooled to form a wire material. The wire material was rolled up in a towing machine, wherein the size and diameter of the wire material was fixed by a pulling force and the wire material was wound into a reel automatically, obtaining a finished product. The above product was used as a 3D printing material, and the 3D printing was conducted on a Replicator II 3D printer of MakerBot with a printing speed of 40 to 45 mm/s.

The printed products obtained show no significant deformation, and the model bases of the printed products have no tilt.

The invention claimed is:

1. A thermoplastic polyurethane elastomer comprising the following components with respect to the total weight of the thermoplastic polyurethane elastomer:
   (A) 22 to 55 wt % of an aromatic diisocyanate and/or an alicyclic diisocyanate;
   (B) 2 to 16 wt % of a chain extender; and
   (C) 30 to 70 wt % of a polyester polyol;
   wherein the polyester polyol has a number average molecular weight of 800 to 4000 g/mol, and the chain extender has a molecular weight of 60 to 600 g/mol
   wherein the polyester polyol is a composition of an aliphatic polyester polyol and an aromatic polyester polyol with a mass ratio of 0.11:1 to 8.5:1, and the aromatic polyester polyol is one or two or more selected from the following structural formulas:

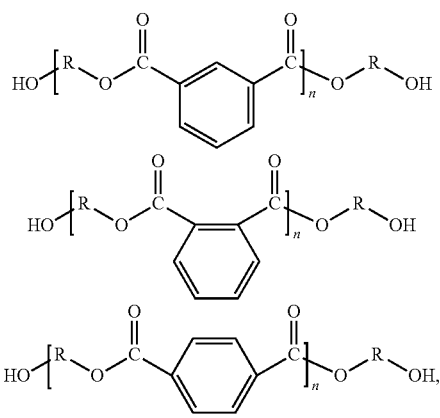

wherein R represents a branched alkylidene having 3 to 12 carbon atoms; and the structural formula of the aliphatic polyester polyol is:

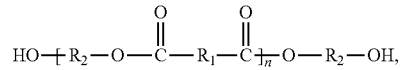

wherein $R_1$ and $R_2$ are independently a linear alkylidene having 2 to 10 carbon atoms or a branched alkylidene having 3 to 10 carbon atoms.

2. The thermoplastic polyurethane elastomer according to claim 1, characterized in that, in the aliphatic polyester polyol, the linear alkylidene has 2 to 6 carbon atoms and side chains of the branched alkylidene have 3 to 5 carbon atoms; in the aromatic polyester polyol, the branched alkylidene has 3 to 6 carbon atoms.

3. The thermoplastic polyurethane elastomer according to claim 2, characterized in that, the molar ratio of the branched alkylidene to the linear alkylidene in the aliphatic polyester polyol is from 1:1 to 7:1.

4. The thermoplastic polyurethane elastomer according to claim 1, characterized in that the chain extender is one or two or more selected from aliphatic diols, aliphatic alcohol amines, alicyclic diamines, aromatic diols, aromatic alcohol amines and aromatic diamines.

5. The thermoplastic polyurethane elastomer according to claim 1, characterized in that the molar ratio of isocyanato to active hydrogen in the thermoplastic polyurethane elastomer is 0.8:1 to 1.3:1.

6. The thermoplastic polyurethane elastomer according to claim 5, characterized in that the molar ratio of isocyanato to active hydrogen in the thermoplastic polyurethane elastomer is 0.9:1 to 1.1:1.

7. The thermoplastic polyurethane elastomer according to claim 1, characterized in that the thermoplastic polyurethane elastomer has a shrinkage of 0.1% to 0.5% and a thermal decomposition temperature of 280 to 310° C.

8. The thermoplastic polyurethane elastomer according to claim 1, which comprises the following components with respect to the total weight of the thermoplastic polyurethane elastomer:
  (A) 25 to 50 wt % of an aromatic diisocyanate and/or an alicyclic diisocyanate;
  (B) 3 to 15 wt % of a chain extender; and
  (C) 35 to 60 wt % of a polyester polyol;
  wherein the polyester polyol has a number average molecular weight of 800 to 4000 g/mol, and the chain extender has a molecular weight of 60 to 600 g/mol.

9. The thermoplastic polyurethane elastomer according to claim 1, characterized in that the polyester polyol is a composition of an aliphatic polyester polyol and an aromatic polyester polyol with a mass ratio of 0.2:1 to 4:1.

10. The thermoplastic polyurethane elastomer according to claim 9, characterized in that, the molar ratio of the branched alkylidene to the linear alkylidene in the aliphatic polyester polyol is from 1:1 to 7:1.

11. A 3D printed article, wherein the printing material of the 3D printed article is the thermoplastic polyurethane elastomer according to claim 1.

12. A process for preparing the thermoplastic polyurethane elastomer according to claim 1, characterized in that 22 to 55 wt % of the diisocyanate, 30 to 70 wt % of the polyester polyol and 2 to 16 wt % of the chain extender are used as raw materials to carry out the polymerization reaction to obtain the thermoplastic polyurethane elastomer.

13. The process for preparing the thermoplastic polyurethane elastomer according to claim 12, characterized in that
  the process comprises the steps of: heating and melting the diisocyanate; adding the polyester polyol and optionally a catalyst to form a stable prepolymer at 70 to 100° C.; mixing the chain extender and the prepolymer evenly; and curing for 20-24 h at 80-120° C., to obtain a thermoplastic polyurethane elastomer; or
  the process comprises the steps of: adding the diisocyanate, the polyester polyol, the chain extender and optionally a catalyst into a mixing apparatus; carrying out the polymerization reaction directly, to obtain the thermoplastic polyurethane elastomer.

* * * * *